O. A. LARSON & C. J. LALLISS.
AUTOMOBILE RADIATOR COVER.
APPLICATION FILED JUNE 15, 1917.
1,292,955.
Patented Jan. 28, 1919.
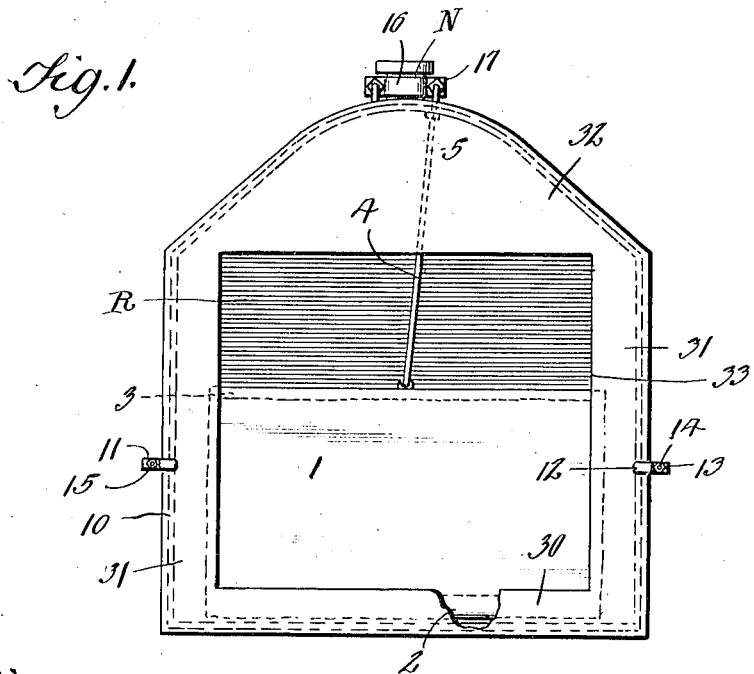
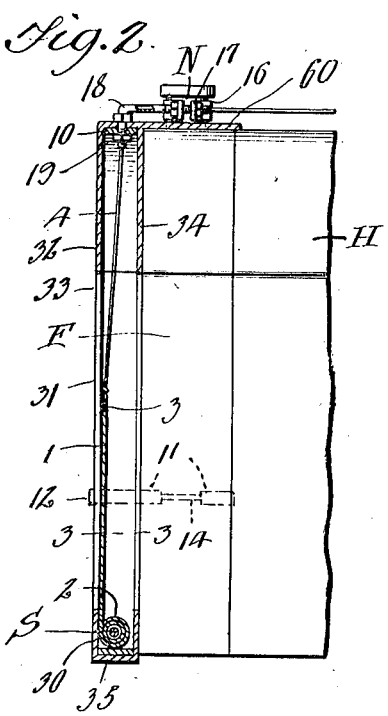
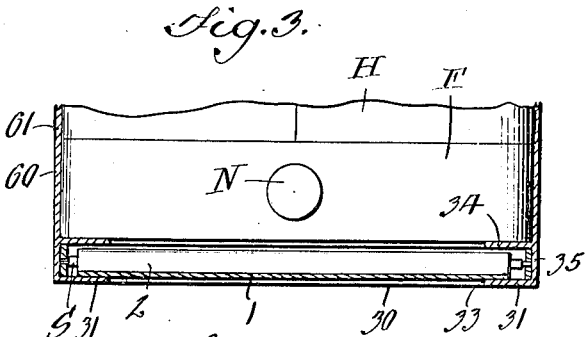
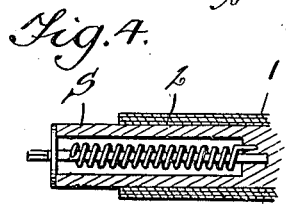
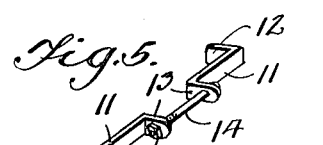
WITNESSES
INVENTORS
O. A. Larson,
C. J. Lallis,
BY Victor J. Evans
ATTORNEY

UNITED STATES PATENT OFFICE.

OLE ALONZO LARSON AND CHARLES J. LALLISS, OF SALT LAKE CITY, UTAH.

AUTOMOBILE RADIATOR-COVER.

1,292,955.  Specification of Letters Patent.  Patented Jan. 28, 1919.

Application filed June 15, 1917. Serial No. 175,015.

*To all whom it may concern:*

Be it known that we, OLE ALONZO LARSON and CHARLES J. LALLISS, citizens of the United States, residing at Salt Lake City, in the county of Salt Lake and State of Utah, have invented new and useful Improvements in Automobile Radiator-Covers, of which the following is a specification.

This invention relates to radiators for automobiles and the like, and more especially to protectors or coverings therefor which are designed to protect the same from cold; and the broad object of the invention is to incase the radiator frame with fabric supported on a frame of its own, and mount in the last-named frame a spring roller on which is wound a shutter capable of being drawn across an opening in the fabric and over the face of the radiator to cover the latter more or less as the conditions require.

This object is carried out as more fully described in the following specification and shown in the accompanying drawings wherein:—

Figure 1 is a front elevation of an automobile radiator provided with this cover, the shutter being partly closed and the operating cord shown as passing through the radiator.

Fig. 2 is a vertical central section through the type of the invention illustrated in Fig. 1 excepting that the operating cord passes over the top of the radiator.

Fig. 3 is a horizontal section on about the line 3—3 of Fig. 2, the radiator being in plan.

Fig. 4 is a detail of the spring roller and

Fig. 5 a perspective detail of the fastener.

In the drawings the letter R has been employed to designate the radiator proper, surrounded as usual with a metallic casing or frame F, H is the hood of the automobile, and S is an ordinary spring roller excepting that the catch therein is removed. It is our purpose to wind on this roller a shutter composed of fabric which may be of pantasote or other similar cloth usually employed for the tops of automobiles and the like, but should be quite tough and substantially water-proof, but we do not wish to be limited in this respect, and any suitable shutter, porous or not, of fabric or other material, capable of being wound as described and unwound as hereinafter set forth, will answer.

Referring now more particularly to the drawings, the numeral 1 designates the shutter whose lower end is attached to the roller S and wound thereon as shown at 2 and whose upper end carries a stiffening bar 3 to whose center is attached a flexible member such as a cord 4 which may be led backward through a guide to within reach of the driver sitting in his seat. In Fig. 2 this guide is a bent tube, but it is one of the parts of a fastening device yet to be described and will find its appropriate number below. In this case, however, the cord 4 leads over the top of the radiator and therefore over the top of the hood and back to the dash within reach of the driver. It is of course possible to terminate the cord at some point adjacent the radiator, rather than carrying it backward to the dash, but this need not be illustrated; nor need I illustrate the means for holding the cord after it has been drawn upon. The tension of the spring roller S normally winds the shutter 1 upon it as shown at 2, and draws its upper end downward to expose the radiator R, and when this cord is drawn upon the shutter is more or less raised and therefore the radiator R is more or less covered as will be clear. In extremely cold weather or when the automobile stands in the garage, it may be desirable to draw the shutter all the way up and entirely cover the radiating surface. In moderate weather in wintertime it may be desirable to permit the spring roller S to wind the shutter 1 completely upon it so that all the radiating surface is exposed.

It is our intention to manufacture the device as part of the equipment of the car when the latter is made, and to this end, 10 designates a frame, preferably of strap metal and of sufficient width to accommodate the spring roller with all the convolutions 2 wound upon it as seen at the bottom of Fig. 2, and of a length and shape to follow the contour of the radiator frame F and to lie against the front face thereof as indicated in dotted lines in Fig. 1. This frame is secured to the radiator at several points. At the sides it is attached by the fastener in Fig. 5, and which consists of two L-shaped members 11 having feet 12 at their outer extremities which engage over the front of the attachment and behind the rear edge of the radiator frame F, and having outturned ears 13 at their inner extremities connected by a bolt 14 whose nut 15 may be set up to tighten the fastener or may be loosened when the entire attachment is to be removed in the summer time. At the top of the frame is another fastening which in effect is a clip surrounding the spout or nipple N of the radiator. This clip is shown in most of the views as consisting of two members 16 having ears 17 at their extremities drawn together by bolts and nuts as usual, and their bodies between the bolts bowed outward to inclose the nipple, and the bolts are suitably attached to the frame 10. In Fig. 2 the bolt is shown L-shaped as at 18, and its down-turned front end is passed through the top of the frame 10 with the nuts 19 above and below the same to hold this frame to the nipple. The body of one of the bolts is shown as tubular, and the cord 4 passes through it as a guide and onward to the rear as explained above. The attachment of the frame 10 to the radiator by the fastening device illustrated and described will hold the same quite rigidly thereon, while permitting its detachment when the entire article is to be removed.

The frame as above described is now inclosed in a cover, which cover is preferably of the same material as the shutter although it could be of metal. It is possible that the cover material should be a little different, because it must lie against the hot radiator and therefore must be proof against excessive heat, but if of metal we preferably line this cover. Viewed from the front, this cover is practically in the shape of a frame comprising a bottom strip 30 standing in front of the spring roller, side strips 31 standing in front of the side bars of the radiator frame F, and a top strip 32 connecting the upper ends of the side strips and shaped to conform with the configuration of the upper portion of the radiator as usual; and these strips surround a sight opening 33 which is substantially square or rectangular, or at least conforms with the radiator proper R while not necessarily exposing any portion of its frame F. If we could view the attachment from the rear, the configuration of the frame would be the same, but we have used the numeral 34 broadly to designate the rear member as seen in section in Fig. 2. Finally there is a strip 35 surrounding the radiator frame F and connecting the edges of the front and rear members above described, and therefore the entire radiator frame is incased by this cover which itself is in the the nature of a frame whose sight opening exposes the surface which it is desired to cover at times with the shutter. The latter is a little wider and a little longer than the sight opening, and therefore its edges extend partly behind the side strips 31 as indicated in dotted lines in Fig. 1, and of course its upper end would be drawn upward behind the top strip 32 as will be clear from an inspection of Fig. 2. The frame in effect, therefore, produces a U-shaped or channeled guide for the edges of the shutter and for the reception of its upper end, and the channel at the bottom of this frame always contains and protects the spring roller and the shutter when wound thereon. From this detailed construction the operation of the attachment when constructed as shown in Figs. 1, 2 and 3, will be clear.

What is claimed as new is:

1. In an automobile radiator cover, the combination with a spring roller, a flexible shutter secured at one end to and wound thereon, and a cord attached to the other end of the shutter and led to the rear of the automobile; of a rigid frame following the contour of the radiator frame and overlying its front face and having bearings for the roller-trunnions, L-shaped bolts attached to the top of this frame and passing over the top of the radiator frame astride the nipple, one of said bolts being tubular and serving as a guide for said cord, and means for clamping said bolts to the nipple, and additional means for clamping the side bars of the frame to the radiator-frame.

2. In an automobile radiator cover, the combination with a spring roller, a flexible shutter secured at one end to and wound thereon, and a cord attached to the other end of the shutter and led to the rear of the automobile; of a rigid frame following the contour of the radiator frame and overlying its front face and having bearings for the roller-trunnions, L-shaped bolts whose upright arms pass through the top of said frame and whose horizontal arms pass rearward over the radiator frame and astride said nipple and are threaded, one of said bolts being tubular and serving as a guide for the cord, a clip in two members whose centers embrace said nipple and whose ends have perforations strung on the threaded portions of said bolts, and nuts on the latter outside the ends of the clip-members, for the purpose set forth.

In testimony whereof we affix our signatures.

OLE ALONZO LARSON.
CHARLES J. LALLISS.